Sept. 30, 1924.
F. M. C. WHEATON
EDUCATIONAL DEVICE
Filed Sept. 28, 1921
1,509,889
Fig. 1.
Fig. 2.
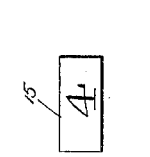
Fig. 3.
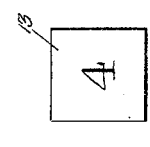
Fig. 4.
Fig. 5.
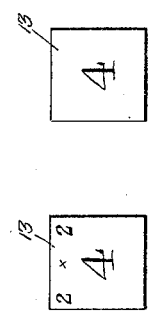
Fig. 6.
F.M.C.Wheaton, INVENTOR.
BY Geo. T. Kimmel ATTORNEY.

Patented Sept. 30, 1924.

1,509,889

UNITED STATES PATENT OFFICE.

FLORENCE M. C. WHEATON, OF SOUTH MANCHESTER, CONNECTICUT.

EDUCATIONAL DEVICE.

Application filed September 28, 1921. Serial No. 503,747.

*To all whom it may concern:*

Be it known that I, FLORENCE M. C. WHEATON, a citizen of the United States, residing at South Manchester, in the county of Hartford and State of Connecticut, have invented certain new and useful Improvements in Educational Devices, of which the following is a specification.

This invention relates to devices for teaching the multiplication of numbers, to children, and has for one of its objects to produce a simply constructed device comprising a chart divided into sections containing multiple numerals and a plurality of cards containing the factors of the chart numerals and adapted to be disposed in order thereon to suggest to the child the proper solution of the combination of the numerals.

Another object of the invention is to provide a device of this character including a chart divided into a plurality of corresponding spaces or sections on its opposite faces, the spaces or sections containing the same multiple numerals on the opposite faces of the chart, with the spaces or sections of one side also containing in addition the factors of the multiple numerals, and a series of cards containing the factors of the multiple numerals.

With these and other objects in view, the invention consists in certain novel features of construction as hereinafter shown and described and then specifically pointed out in the claims, and in the drawings illustrative of the preferred embodiment of the invention;—

Figure 1 is a view of a conventional chart illustrating one face thereof,

Figure 2 is a view of the conventional chart illustrating the opposite face,

Figure 3 is a view of one of the larger cards showing the face corresponding to a portion of the face of the chart shown in Fig. 1, Figure 4 is a view of the reverse face of the card shown in Figure 3 showing the face corresponding to a portion of the face of the chart shown in Fig. 2, Figure 5 is a view of one of the smaller cards showing the face corresponding to a portion of the showing on the chart shown in Fig. 1, Figure 6 is a view of one of the smaller cards showing the face corresponding to a portion of the chart in Fig. 2.

The improved device is designed to be employed for teaching the multiplication of numerals to children, more particularly to children of primary age and likewise to the children in the lower grades of graded schools.

The improved device comprises a body portion in the form of a chart represented as a whole by 10 and has each face thereof divided by lines 11 into a plurality of uniform sized spaces or sections 12. Each face of the chart will be thus divided into spaces or sections, the spaces or sections being the same in number and size on opposite faces of the chart.

The charts may be of any desired size or material, and divided into separate portions.

For the purpose of illustration, six sets of the line divided sections are shown on each face of the chart, each section showing a multiple of from $2\times2=4$, to $9\times9=81$.

In addition to the multiple numerals 4—6—8—9 and so forth, the spaces or sections on one face of the chart also contain the factors of the respective numerals. For instance the section containing the multiple "4" on one face of the chart also contains the factors $2\times2$, and so on throughout the same face of the chart. One of said factors constituting a multiplicand for the other so on multiplying one by the other the multiple will be produced.

There is also provided for each section of the chart, a card 13 corresponding in size to the chart section and containing on each face a numeral corresponding to one of the multiple numerals of the chart sections, and in addition, one face of the card contains the factors of the multiple numeral.

For instance, Figs. 3 and 4 show the two faces of one of the cards 13 as above described.

There is also provided another set of smaller cards, one of which is represented in Fig. 5, and containing only the factors of the multiple numerals of the chart sections and of the larger cards.

There is also provided a set of cards of intermediate size, as illustrated at 15 in Fig. 6, and containing the multiple numerals of the chart sections and of the larger cards.

The improved device is readily adapted for the use of children in the primary class, and also to children in the lower grades of the schools.

When employed for teaching younger children, the chart is placed before the child with the face shown in Fig. 2 uppermost, and a set of the medium sized cards shown in Fig. 6 issued to the child who is instructed to place the cards on the sections containing the same numerals.

In this way the child soon learns to distinguish the different numerals at sight.

In the case of older children the chart is presented with the face shown in Fig. 1 uppermost, and a set of the smaller cards shown in Fig. 5 issued, and the child instructed to place them over the corresponding numerals or factors of the larger numerals, and the child very soon learns to compute the value of the factors relative to the multiple numerals, and connects the relative value of the different numerals. For instance, the placing of the smaller card containing the characters 2×2 over the corresponding character on the chart section associates the characters in the child's mind with the character 4 and he soon learns that 2×2=4, and so on with the other combinations of numerals.

For the more advanced child, the chart is turned with the face shown in Fig. 2 uppermost and a set of the smaller cards shown in Fig. 5 issued to the child with instructions to place them in their proper places on the sections of the chart which he soon learns to do and in this way soon learns the whole multiplication table and with little or no mental effort.

For convenience in transportation the charts will preferably be divided into small portions, for instance two rows or columns of sections in each portion of the chart and with a supply of the cards in sufficient quantity to enable a relatively large number of children to use the charts and the cards and receive instructions at the same time.

The different sized cards will be contained in separate and suitable boxes or like receptacles to keep them in convenient position for use, and the whole enclosed in a larger box or other suitable receptacle.

The preferred embodiment of the invention is disclosed in the drawings and set forth in the specification, but it will be understood that modifications within the scope of the claims may be made in the construction without departing from the principle of the invention or sacrificing any of its advantages.

Having thus fully described the invention, what is claimed is:—

1. An apparatus for teaching arithmetic comprising a body portion provided with means to form one face thereof with a plurality of sections and means within each of said sections to constitute a multiple, a factor thereof, a multiplicand for the factor to produce such multiple and a multiplication symbol between the factor and the multiplicand, and a set of cards, each of the cards of said set associated with a section and having one face thereof provided with indicia corresponding to the indicia in that section with which the card associates, each of said cards having its other face provided with means to constitute a multiple corresponding to the multiple in that section with which the card associates, the indicia in each of said sections being different from each other.

2. An apparatus for teaching arithmetic comprising a body portion provided with means to form one face thereof with a plurality of sections and means within each of said sections to constitute a multiple, a factor thereof, a multiplicand for the factor to produce such multiple and a multiplication symbol between the factor and the multiplicand, and a set of cards, each of the cards of said set associated with a section and having one face thereof provided with indicia corresponding to the indicia in that section with which the card associates, each of said cards having its other face provided with means to constitute a multiple corresponding to the multiple in that section with which the card associates, the indicia in each of said sections being different from each other, and said body portion further having its other face provided with means to form a plurality of sections each provided with indicia to constitute a multiple.

3. An apparatus for teaching arithmetic comprising a body portion provided with means to form one face thereof with a plurality of sections and means within each of said sections to constitute a multiple, a factor thereof, a multiplicand for the factor to produce such multiple and a multiplication symbol between the factor and the multiplicand, and a set of cards, each of the cards of said set associated with a section and having one face thereof provided with indicia corresponding to the indicia in that section with which the card associates, each of said cards having its other face provided with means to constitute a multiple corresponding to the multiple in that section with which the card associates, the indicia in each of said sections being different from each other, a second set of cards, and each of the cards of said second set associated with one of said sections and having one face provided with means to constitute a factor and a multiplicand for the factor corresponding to certain of the indicia in that section with which the card associates.

4. An apparatus for teaching arithmetic comprising a body portion provided with means to form one face thereof with a plurality of sections and means within each of said sections to constitute a multiple, a factor thereof, a multiplicand for the factor to produce such multiple and a multiplication symbol between the factor and the multiplicand, and a set of cards, each of the cards of said set associated with a section and having one face thereof provided with indicia corresponding to the indicia in that section with which the card associates, each of said cards having its other face provided with means to constitute a multiple corresponding to the multiple in that section with which the card associates, the indicia in each of said sections being different from each other, a second set of cards, and each of the cards of said second set associated with one of said sections and having one face provided with means to constitute a factor and a multiplicand for the factor corresponding to certain of the indicia in that section with which the card associates, and a third set of cards, each of the cards of said third set having one face provided with means to constitute a multiple corresponding to that in the space or section with which the card associates.

5. An apparatus for teaching arithmetic comprising a body portion provided with means to form one face thereof with a plurality of sections and means within each of said sections to constitute a multiple, a factor thereof, a multiplicand for the factor to produce such multiple and a multiplication symbol between the factor and the multiplicand, and a set of cards, each of the cards of said set associated with a section and having one face thereof provided with indicia corresponding to the indicia in that section with which the card associates, each of said cards having its other face provided with means to constitute a multiple corresponding to the multiple in that section with which the card associates, the indicia in each of said sections being different from each other, and said body portion further having its other face provided with means to form a plurality of sections each provided with indicia to constitute a multiple, a second set of cards, each of the cards of said second set associated with a section and having one face provided with means to constitute a factor and a multiplicand therefor corresponding to certain of the indicia of the section with which the card associates, and a third set of cards, each of the cards of said third set having one face provided with means to constitute a multiple corresponding to the multiple in that section with which the card associates.

In testimony whereof, I affix my signature hereto.

FLORENCE M. C. WHEATON.